(No Model.)
T. J. INGRAHAM.
WIRE FENCING.
No. 469,062. Patented Feb. 16, 1892.
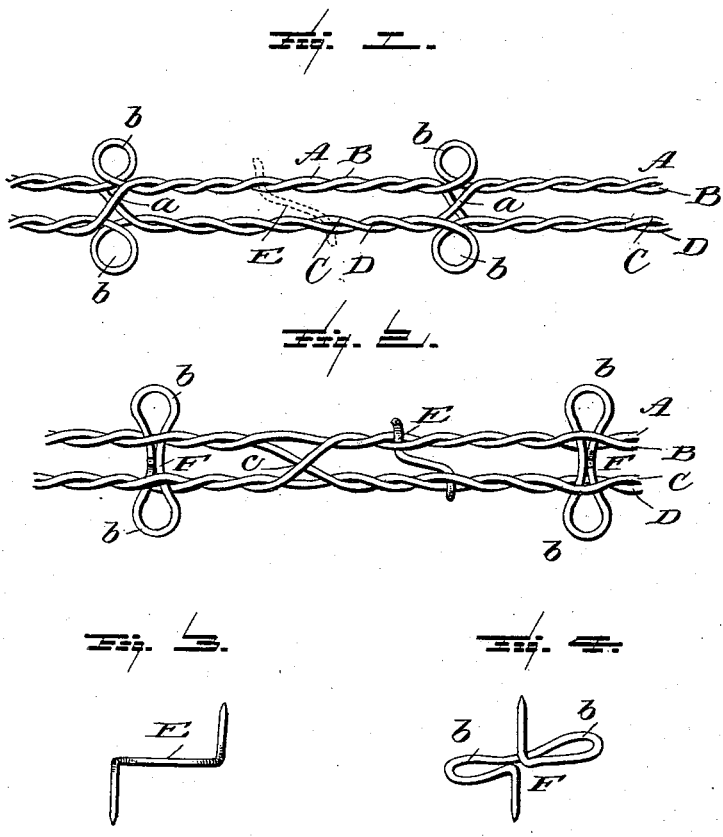

UNITED STATES PATENT OFFICE.

THOMAS J. INGRAHAM, OF HORNELLSVILLE, NEW YORK, ASSIGNOR OF ONE-HALF TO FRANCIS G. BABCOCK, OF SAME PLACE.

WIRE FENCING.

SPECIFICATION forming part of Letters Patent No. 469,062, dated February 16, 1892.

Application filed May 26, 1891. Serial No. 394,172. (No model.)

*To all whom it may concern:*

Be it known that I, THOMAS J. INGRAHAM, a citizen of the United States, residing at Hornellsville, in the county of Steuben, State of New York, have invented certain new and useful Improvements in Wire Fencing, of which the following is a specification, reference being had therein to the accompanying drawings.

This invention relates to certain new and useful improvements in fencing-strands; and it has for its objects, among others, to provide a simple, cheap, and easily-constructed fencing-strand capable of manufacture either by hand or machinery and in some of its forms embodying a barb. I form the outer portions of the strand of twisted wires and either interweave them to form ornamental cross portions or cross them to form an ornamental brace. A barb or barbs may be provided either formed of the said cross portions or independent thereof.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a side elevation of a portion of a strand constructed in accordance with my invention. Fig. 2 is a like view of a slightly-modified form. Fig. 3 is a side view of one form of barb detached. Fig. 4 is a perspective view of the other form of barb detached.

Like letters of reference indicate like parts in the several views where they occur.

Referring now to the details of the drawings by letter, A designates one of the wires and B another, which are twisted together to form one of the outer portions of the strand. C and D designate the other two wires, which are twisted together to form the other outer portions of the strand. These wires may be of any desired size and galvanized or not, as preferred. The wires A and B and the wires C and D are twisted as above described and as shown, and at predetermined intervals one of the wires of each set is extended at an angle and the two wires are crossed, as shown at *a* in Fig. 1. The other wires of the two sets are extended outwardly and formed into a coil or loop *b*, as shown, the wires then being extended in the direction which they first assumed and twisted, and at the next cross arranged in the same way, and so on. I sometimes arrange barbs E in the twists of the outer wires, as shown in dotted lines in Fig. 1, the barb being of the form shown in Fig. 3, the ends being confined between the twists of the outer wires, as shown in dotted lines in Fig. 1. In the form shown in Fig. 2 the outer wires are twisted, as in the form shown in Fig. 1, and crossed, as at *c*, at desired points. In this form I may employ the barbs E the same as in the form illustrated in Fig. 1, or these may be omitted. The transverse portions are formed of separate pieces of wire F, instead of the outer wires, and the ends of these separate pieces constitute barbs, Fig. 4 illustrating the form thereof before being applied to the strand, the said pieces being confined between the twists of the outer wires with the points thereof extending at right angles to the length of fence in opposite directions. The loops *b* may serve as convenient means of fastening the strand in place, the said strand being also adapted for other uses than as a fencing-strand—for box-fasteners, for instance.

What I claim as new is—

1. A fencing-strand composed of outer twisted wires, the same being crossed at intervals and provided with loops, as set forth.

2. A fencing-strand composed of outer twisted wires crossed at intervals, barbs held between the twists of the wires, and transverse wires formed with projecting loops, as set forth.

3. A fencing-strand composed of outer twisted wires crossed at intervals and separately-formed transverse pieces held between the twists of the outer wires and formed with projecting loops, the ends of said separate pieces being extended in opposite directions at right angles to the length of the strand, as set forth.

In testimony whereof I affix my signature in presence of two witnesses.

THOMAS J. INGRAHAM.

Witnesses:
FRANCIS G. BABCOCK,
WELLINGTON SALT.